(12) United States Patent
Susnow et al.

(10) Patent No.: US 6,751,235 B1
(45) Date of Patent: Jun. 15, 2004

(54) COMMUNICATION LINK SYNCHRONIZATION METHOD

(75) Inventors: Dean S. Susnow, Portland, OR (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 09/604,244

(22) Filed: Jun. 27, 2000

(51) Int. Cl.$^7$ .................................................. H04J 3/06
(52) U.S. Cl. ...................... 370/503; 370/388; 370/510
(58) Field of Search ................................ 370/386, 388, 370/389, 395.62, 459, 465, 503, 509, 510, 512, 514, 520, 400, 401, 404, 412, 507, 511, 513

(56) References Cited

U.S. PATENT DOCUMENTS 5,905,587 A * 5/1999 Maeno et al. .................. 398/45
6,594,329 B1 * 7/2003 Susnow ....................... 375/372

* cited by examiner

Primary Examiner—Phirin Sam
(74) Attorney, Agent, or Firm—Kenyon & Kenyon

(57) ABSTRACT

A communication link is synchronized by a network interface having a transmitter in a core clock domain different from the link clock domain of the communication link. A link synchronization state machine controls the link synchronization process. The functionality of the link synchronization state machine is partitioned so that some of the functions of the link synchronization process are performed by the transmitter in the core clock domain.

18 Claims, 8 Drawing Sheets

COMMUNICATION LINK SYNCHRONIZATION METHOD

BACKGROUND

1. Field of the Invention

This invention relates generally to the transfer of data over a communication link. In particular, the present invention relates to methods of synchronizing a communication link for transferring data.

2. Description of the Related Art

One challenge to implementing a data network which utilizes a channel-oriented, switched fabric, serial link architecture is to ensure that the high-speed data communications between a data transmitter (source node) and a data receiver (destination node) operating in two different clocks are synchronous with respect to the transmission and reception of data within each data packet. Such data transmitter and data receiver may correspond to different network nodes (end stations such as host computers, servers, and/or I/O devices) and operate in synchrony with different clock signals. Failure to maintain synchronization between the data transmitter and data receiver may result in the miscommunication (data corruption) and therefore, effective loss of data.

As shown in FIG. 1, a network interface controller (NIC) has both a transmitter and a receiver. Each NIC in FIG. 1 has only a single transmitter/receiver pair. However, a NIC can have any number of such pairs ("ports") supporting respective links. Link synchronization is the process of synchronizing the transmitters and receivers on each end of a serial link. Prior to link establishment, a transmitter is under the control of that port's receiver. The receiver essentially determines the necessary transmission sequence based on the data received on the link.

One common link synchronization method uses IDLE sequences. Specifically, a first device initiates the process by transmitting IDLE-1 characters to a second device until 3 consecutive IDLE-1 characters are received. At that time, the device transmits IDLE-2 characters until a single IDLE-2 character is received. Upon reception of the IDLE-2 character, link is determined to be synchronized and therefore established. At the point where link is determined to be established, the corresponding receiver no longer controls the transmitter and transmit data becomes a function of the transmit state machine.

FIG. 2 depicts a suggested interaction between a NIC transmitter and receiver pair for link synchronization. The receiver is divided into receiver and physical (PHY) blocks based on clock source. The PHY block receives the RXCLK clock signal from the SERDES and operates in the RXCLK domain. The receiver and transmitter blocks both receive a Core Clk signal from the silicon core and function in the core clock domain. The XMIT_I1 and XMIT_I2 control signals signify to the transmitter which synchronization character (Idle-1 or Idle-2) requires transmission in order to establish link. The Link_Good signal indicates when the serial link has been synchronized (established) and the transmitter then assumes control of the transmit data stream.

The Link Synchronization machine presumably resides in the PHY block, which operates in the time domain of the RXCLK signal from the SERDES. This poses a significant design challenge since the transmitter, requiring control during link synchronization, resides in the time domain of the Core Clk signal from the silicon core. Passing control signals across the two domains and the implied latency makes the implementation of the Link Synchronization State Machine difficult and provides relatively low performance.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

While example embodiments are described herein, the present invention is applicable for use with all types of computer networks, I/O channel adapters and switches, generally including all designs which link together disparate processing systems such as computers, servers, peripherals, storage devices, and devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), System I/O (SIO), Infiniband or other channel based, switched fabric architecture. LAN networks may include versions of Ethernet, FDDI (Fiber Distributed Date Interface), Token Ring, Asynchronous Transfer Mode (ATM), Fiber Channel and Wireless. For the sake of simplicity, discussions will concentrate mainly on NGIO or Infiniband networks having several nodes (e.g., computers, servers and I/O units) interconnected by corresponding channel adapters to a network fabric having a plurality of links and switches, although the scope of the present invention is not limited thereto. A wide variety of implementations, arrangements and configurations of end stations (e.g., host systems and I/O units), channel adapters, switches and links in all types of data networks may be possible.

According to an example embodiment or implementation, the end stations utilize channel adapters compatible with the NGIO specifications published by the NGIO forum on about Jul. 20, 1999 or Version 0.9 of the specifications distributed by the Infiniband Trade Association (www.infinibandta.org). Accordingly, the network consists of a switched fabric (e.g., collection of links, switches and/or switch elements connecting a number of host systems and I/O units), and the endpoint may be a host processing system including one or more host channel adapters (HCAs), or a target system, such as an I/O unit, including one or more target channel adapters (TCAs). Both the host channel adapter (HCA) and the target channel adapter (TCA) may be broadly considered as fabric adapters provided to interface endpoints to the network fabric, and may be implemented in compliance with the NGIO or draft Infiniband specifications for enabling the endpoints (nodes) to communicate to each other over a channel(s).

Figure 1:
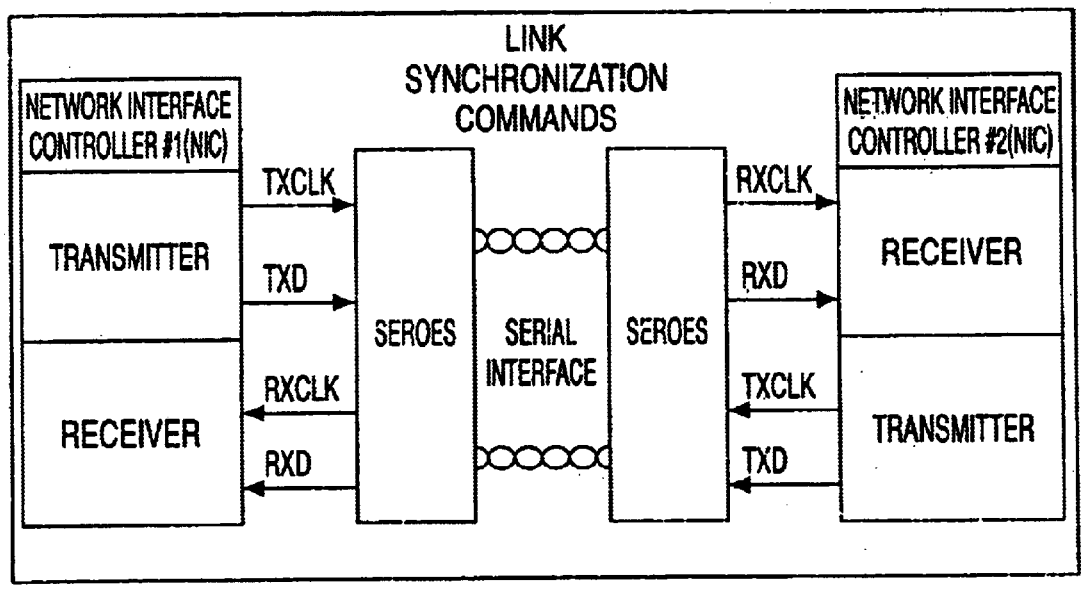
FIG. 1 is a generalized block diagram of a prior art link synchronization.
Figure 2:
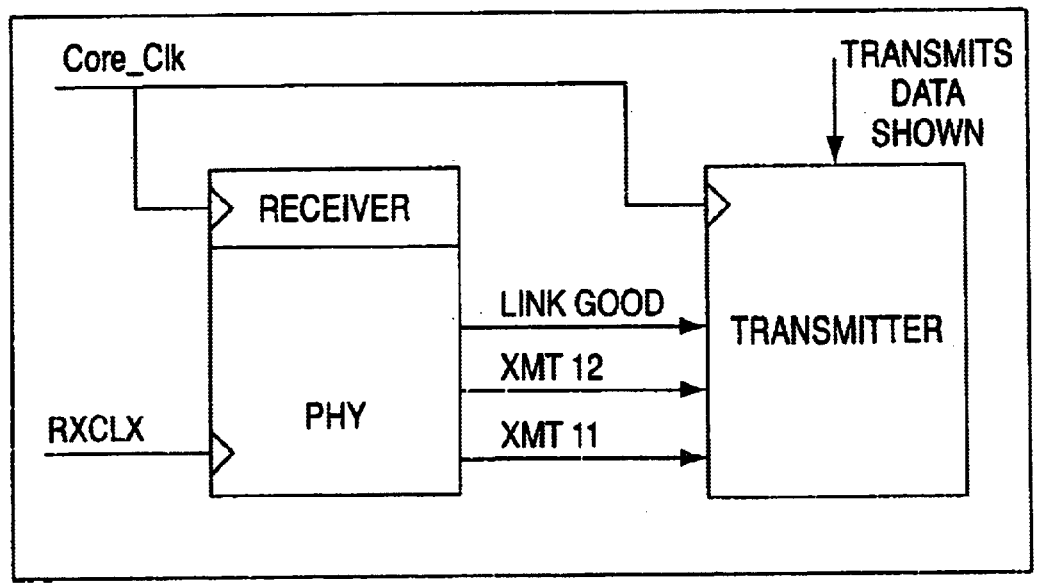
FIG. 2 is a generalized block diagram of a prior art receiver/transmitter interaction for link synchronization.
Figure 3:
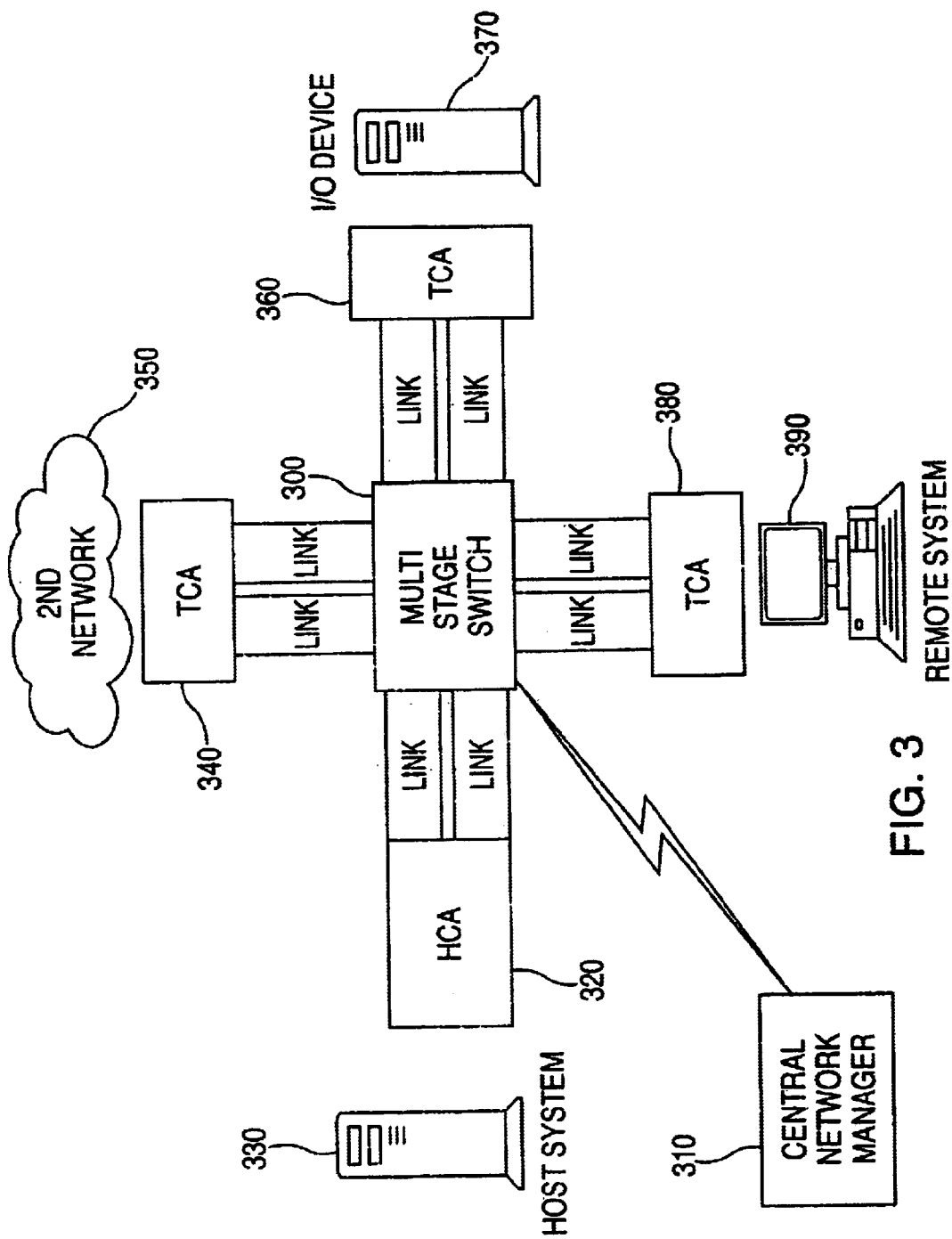
FIG. 3 illustrates a network in which an example embodiment of the invention may be practiced.

FIG. 3 schematically represents a data network using NGIO or Infiniband architecture to transmit data over point-to-point links into a device responsible for processing that data according to an embodiment of the present invention. As shown in FIG. 3, the computer network includes a multi-stage switch 300 comprised of a plurality of switches for allowing host systems and target systems to communicate to a large number of other host systems and target systems. Although a single multi-stage switch is shown in FIG. 3, a number of end stations, switches and links, etc., are used to relay data in groups of cells between the end stations and switches via corresponding links and are generally collectively referred to as the network fabric. The nodes shown in FIG. 3 include: a host processing system 330; another network, including, but not limited to, a local area network (LAN), ATM, fibre channel network, and the Internet; an input/output (I/O) device 370; and a remote system 390 such as a computer or server. However, the nodes may include any other processing device or intermediate node.

The network fabric may include a central network manager 310 connected to multi-stage switch 300 and other fabric elements for managing network management functions. However, the central network manager 310 may alternatively be incorporated as part of either the host processing system 330, the second network 350, the I/O device 370, or the remote system 390. In either situation, it may be configured for learning network topology, determining the switch table or forwarding database, detecting and managing faults or link failures in the network and performing other network management functions.

A host channel adapter (HCA) 320 provides an interface between a memory controller (not shown) of the host processing system 330 and multi-stage switch 300 via high speed serial links. Similarly, target channel adapters (TCA) 340 and 360 provide an interface between multi-stage switch 300 and an I/O controller of either a second network 350 or an I/O device 370 via high speed serial links. Another target channel adapter (TCA) 380 may provide an interface between a memory controller (not shown) of the remote system 390 and the multi-stage switch 300 via high speed serial links. Of course, a processing system such as host processing system 330 or remote system 390 may have both a host channel adapter and a target channel adapter. The circuits and methods described below may be provided as part of a host channel adapter to transition data from a host processing system which operates according to a locally generated clock signal or as part of a target channel adapter to transition data from a link into the respective target system which operates in the Receiver Clock domain.

Figure 4:
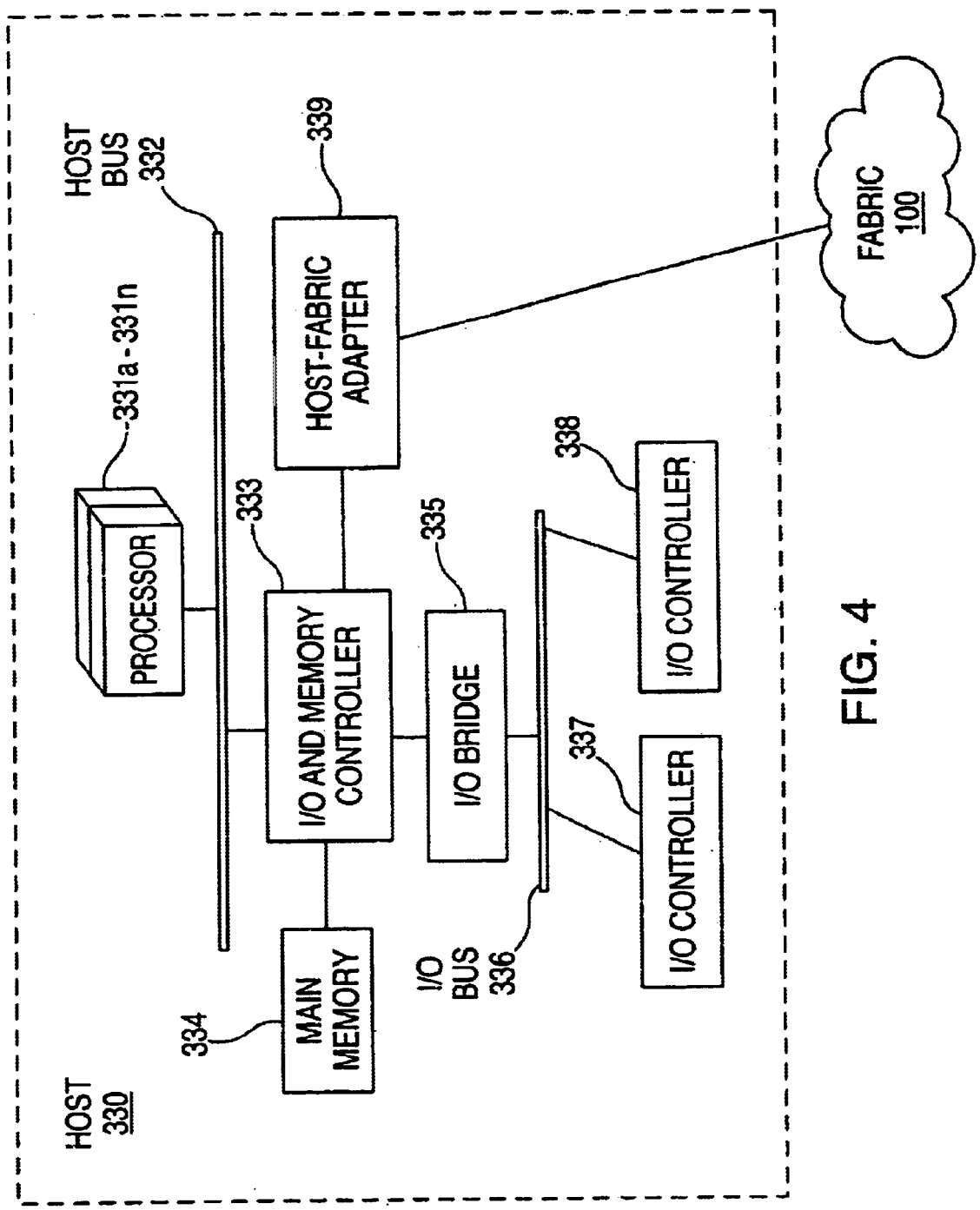
FIG. 4 is a generalized block diagram showing one possible implementation of a host channel adapter according to the invention to connect a processing system to a network.

An example implementation of host processing system 330 or 390 is shown in FIG. 4. Host processing system 330 or 390 may be a multi-processor system, including one or more processors 331a–331n coupled to a host bus 332. Each of the multiple processors 331a–331n may operate on a single item (I/O operation), and all of the multiple processors 331a–331n may operate on multiple items (I/O operations) on a list at the same time. An I/O and memory controller interface 333 (or chipset) is connected to the host bus 332. A main memory 334 may be connected to the I/O and memory controller 333. An I/O bridge 335 operates to bridge or interface between the I/O and memory controller 333 and an I/O bus 336. Several I/O controllers may be attached to I/O bus 336, including I/O controllers 337 and 338. I/O controllers 337 and 338 (including any I/O devices connected thereto) may provide bus-based I/O resources.

Figure 5:
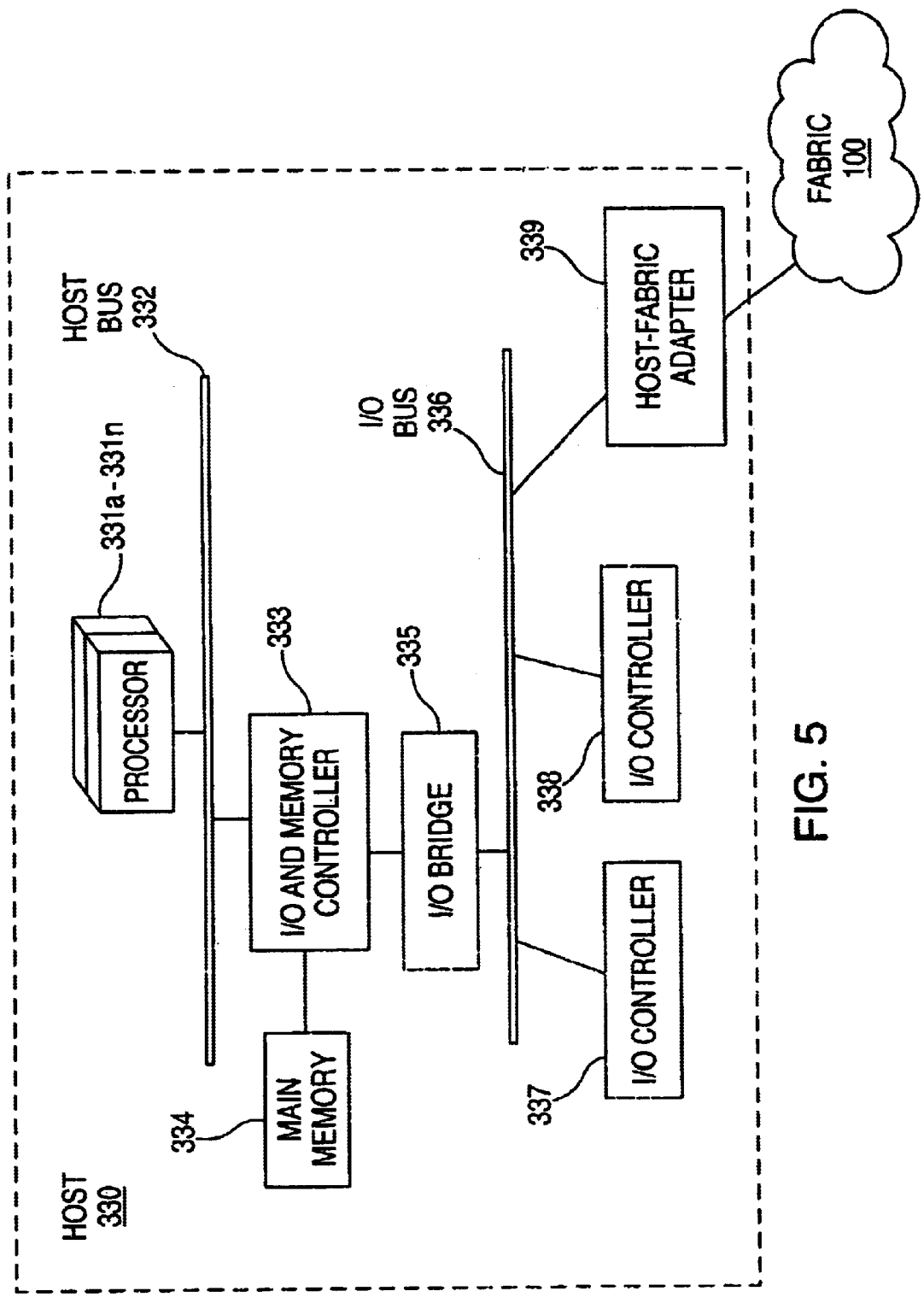
FIG. 5 is a generalized block diagram showing another possible implementation of a host channel adapter according to the invention to connect a processing system to a network.

As shown in FIG. 4, a channel adapter 339 is preferably connected between the I/O and memory controller 333 and the network switching fabric 100. In the event that the I/O and memory controller 333 in any given processing system cannot directly support channel adapter 339, then a channel adapter 339' can be connected to PCI bus via an expansion card as shown in FIG. 5. However, the connection of a channel adapter directly to the I/O and memory controller 333 as shown in FIG. 4 has the advantage of avoiding the limitations of the I/O bus 336. In either instance, one or more fabric channel adapters may be provided to interface the host processing system 330 to the network switching fabric 100.

A software stack may be provided in channel adapter 339 or 339' to access the network switching fabric 100 and information about fabric configuration, fabric topology and connection information. The operating system (not shown) of the processing system 330 may include a fabric bus driver and a fabric adapter device-specific driver utilized to establish communication with a remote fabric-attached agent (e.g., I/O controller) of another processing system connected to the network, and perform functions common to most drivers, including, for example, host-fabric adapter initialization and configuration, channel configuration, channel abstraction, resource management, fabric management service and operations, send/receive I/O transaction messages, remote direct memory access (rDMA) transactions (e.g., read and write operations), queue management, memory registration, descriptor management, message flow control, and transient error handling and recovery. Such a software driver module may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available for a network administrator to conveniently plug-in or download into an existing operating system (OS). Such a software driver module may also be bundled with the existing operating system which may be activated by a particular device driver.

The example embodiments of the invention described in this application are implemented in a hardware device compliant with the NGIO or Infiniband specifications. The example embodiment and other embodiments of the invention can be implemented in conjunction with other types of switch fabric-based I/O architectures. The example embodiment uses a similar model for input/output data transfer as is specified by the Virtual Interface (VI) architecture. A highly efficient interface may thus be beneficially used by various computer devices having NGIO or Infiniband hardware connected to a network fabric. However, the example embodiments and other embodiments of the invention may also be used with hardware other than NGIO or Infiniband hardware. However, such an implementation is but one possible application of the example embodiments which may, of course, be applied in any device having a processor and indeed in any server architecture where an improvement in the speed of communications with a network is desired for whatever reason.

Figure 6:
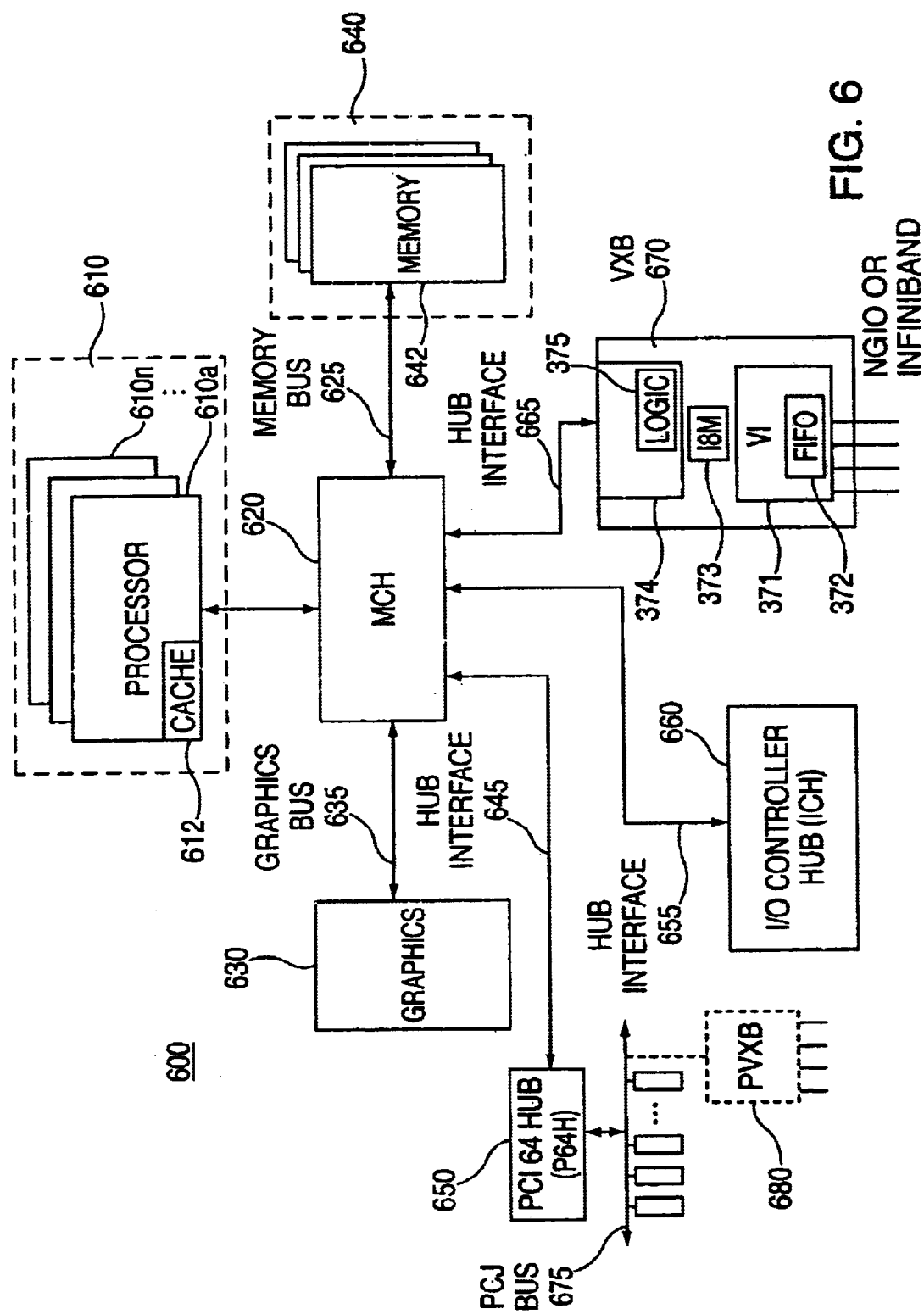
FIG. 6 shows a possible architecture of a host processing system having an example embodiment of the invention included in a virtual interface expansion bridge thereof.

Attention now is directed to FIG. 6, an example computer system platform having an example virtual interface expansion bridge (VXB) incorporated therein and utilizing the principles of the present invention. As shown in FIG. 6, the computer system 600 may comprise a processor subsystem 610 (which may be comprised of a plurality of processors and at least one cache memory 612), a memory controller hub (MCH) 620 connected to the processor subsystem 610 (such as by a host or a processor front side bus), a graphics subsystem 630 (possibly including a AGP 4× graphics controller, a local memory and a display device such as a cathode ray tube, liquid crystal display, or flat panel display) connected to the memory controller hub 620 by a graphics bus 635 (such as an AGP 2.0 bus), and a memory subsystem 640 storing information and instructions for use by the processor subsystem 610 and having at least one memory element 642 connected to MCH 620 by a memory bus 625. The memory element 642 is preferably a dynamic random-access-memory (DRAM), but may be substituted for read-only-memory (ROM), video random-access-memory (VRAM) and the like. The memory element 642 stores information and instructions for use by the host processors 610a–610n.

There may also be a plurality of controller hubs connected to MCH 620 for providing interfaces with various peripheral devices and buses. For example, a 64-bit hub bridge (P64H) 650 for a Peripheral Component Interconnect (PCI) bus may be connected to MCH 620 by a 16 bit hub interface 645, and may operate as an interface between MCH 620 and PCI bus 675. PCI bus 675 may be a high performance 32 or 64 bit synchronous bus with automatic configurability and multiplexed address, control and data lines as described in the latest version of "*PCI Local Bus Specification, Revision* 2.2" set forth by the PCI Special Interest Group (SIG) on Dec. 18,1998 for add-on arrangements (e.g., expansion cards) with new video, networking, or disk memory storage capabilities.

An I/O Controller Hub 660 may be connected to MCH 620 by a 16 bit hub interface 655, and may operate as an interface between MCH 620 and a plurality of input/output devices and/or buses (not shown). The buses may include, for example, a PCI bus, a Industry Standard Architecture (ISA) or an Expanded Industry Standard Architecture (EISA) bus. The I/O devices may include, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

A Virtual Interface Expansion Bridge (VXB) 670 may be connected to MCH 620 by a 16-bit hub interface 665, and operates as an interface between MCH 620 and network fabric 100. There may also be, alternatively or in addition to VXB 670, a PCI Virtual Interface Expansion Bridge (PVXB) 680 connected to a PCI bus, such as PCI bus 675, and which operates as an interface between the PCI bus and network fabric 100. PVXB 680 may, but need not be, substantially similar to VXB 670. In an example embodiment, PVXB 680 and VXB 670 each utilize a silicon chip of a design having at least two different output stages, alternatively supporting either a PCI connection or a hub interface, so that any individual silicon chip can be utilized as either a PVXB or VXB by selectively connecting one of the output stages to the external leads of the silicon chip during the later steps of producing the silicon chip. Although only VXB 670 is mentioned hereafter in this detailed description, it should be understood that the description thereof is equally applicable to PVXB 680.

As a non-limiting example, MCH 620, PCI 64 Hub 650 and I/O Controller Hub 660 of computer system 600 may comprise an Intel® 840 chipset or similar Intel® chipset. Of course, computer system 600 may utilize different I/O or memory controllers, may be configured differently, or employ some additional or different components than those shown in FIG. 6. In particular, a VXB may be easily added to any computer system having a PCI bus by installation of a PVXB add-on card.

VXB 670 includes an NGIO or Infiniband compliant host channel adapter as well as other circuitry to transition data from the host channel adapter to MCH 620. Specifically, VXB 670 receives data from network serial links in byte granularity and converts it into naturally aligned quad-words (64 bits) suitable for transfer on the host bus. The data may be control or payload. In general, the payload data is destined to main memory. VXB 670 also aligns the byte oriented payload data from the network link into naturally aligned quad-words ready for transmission on the host bus.

Other circuitry in VXB 670 includes the VI architecture developed as an improvement over TCP/IP communication protocols in certain network environments. The Transmission Control Protocol (TCP) is a sliding window flow control protocol that uses sequence numbers, acknowledgments, error detection, retransmission of lost packets, etc., where the underlying network environment is presumed to be inherently unreliable. However, the centralized in-kernel protocol processing in TCP/IP networks prohibits applications from realizing the potential raw hardware performance offered by underlying high-speed networks. In contrast, the Virtual Interface (VI) Architecture enables distributed applications to perform low overhead communication over high-bandwidth, low-latency networks interconnecting nodes within a distributed computer system. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware.

While providing high reliability, the VI architecture does not perform other transport level functions, including flow control, buffer management, segmentation and reassembly, and link synchronization. Signaling protocols for the links in the example embodiments thus contain code groups to signal the beginning and end of a cell and the gap between cells, and code groups controlling the flow of cells across the link. For example, Start of Cell Delimiter (SCD) and End of Cell Delimiter (ECD) characters, inter-cell flow control sequences (comma character and associated flow control character) and IDLE characters may be taken into account to determine the maximum defined period between IDLE characters. Specifically, the IDLE characters are available in two distinct IDLE sequences: IDLE-1 and IDLE-2. IDLE characters may be transmitted on the link either during link synchronization periods or inter-cell gap periods (IDLE periods which must occur between transmitted cells).

Figure 7:
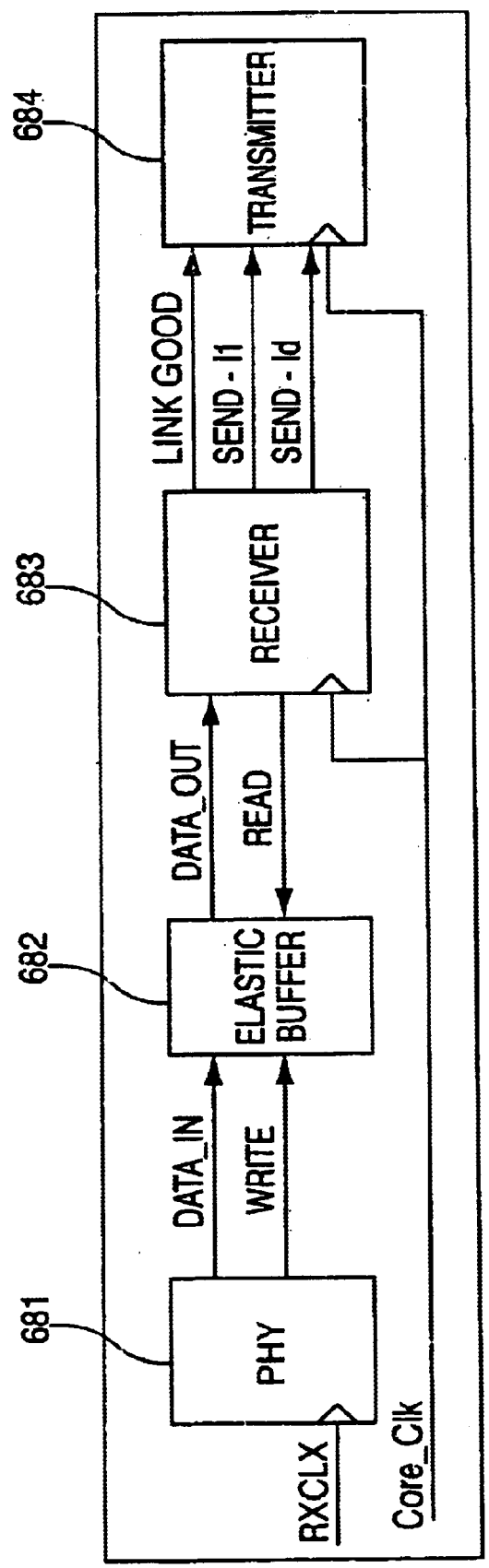
FIG. 7 is a block diagram of the architecture of a portion of the virtual interface expansion bridge according to an example embodiment of the invention.

Turning now to FIG. 7, a generalized block diagram is provided of an example data receiver in VXB 670 synchronizing data received from a link in the RXCLK domain into the core clock domain. Once in the core clock domain, other circuitry (not shown) in VXB 670 forwards the data to MCH 620.

Under normal operation, received link data is transferred from PHY block 681 (operating in the RXCLK domain) to receiver block 683 (operating in the core clock domain) by means of an Elastic Buffer 682. Elastic Buffer 682 is required due to the asynchronous nature of the two clock domains. It is used to pass data and, during link synchronization, pass link synchronization commands to Transmitter block 684 without asynchronous sideband signals. The data receiver may be implemented as a block of logic (e.g., hardware, software and firmware) residing in VXB 670 between the network link and the other circuitry responsible for transferring the data to MCH 620. Data synchronization between these elements must be established, otherwise mis-communication (data corruption) and effective loss of data may occur.

For example, if the RXCLK happens to be faster than the core clock, then the link data arrives faster than the data receiver may process the link data. Consequently, link data may overflow and be lost at VXB 670. Likewise, if the core clock happens to be faster than the RXCLK, there may be times when there may be no receiver data to process due to the respective clock differences. Consequently, link data may underflow and the same data may be processed twice since the core clock is faster. In either situation, the data transferred from VXB 670 may not correspond to the data actually transmitted on the link.

Figure 8:
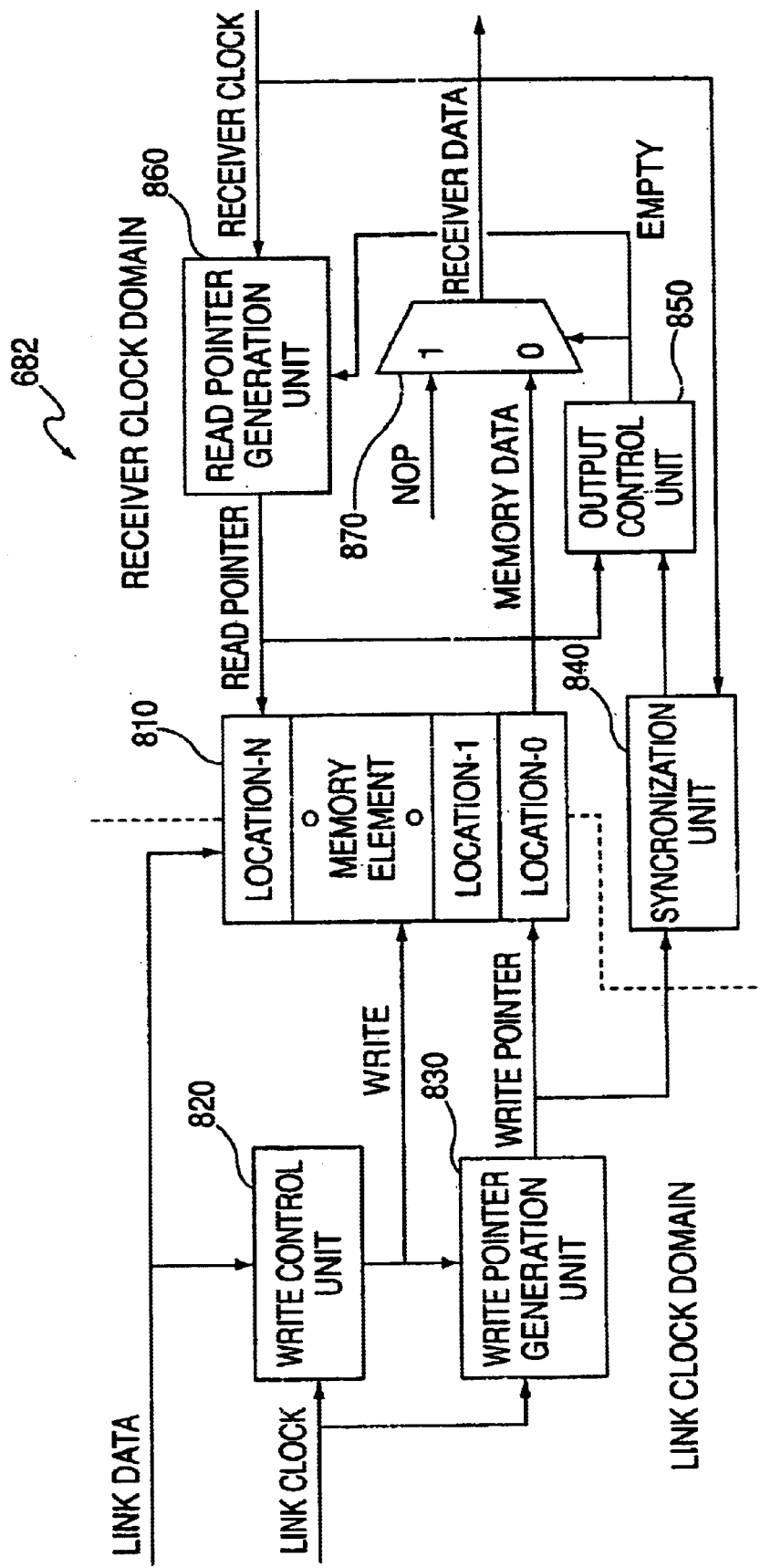
FIG. 8 is a block diagram of an elastic buffer used in the example embodiment of the invention.

The architecture of PHY block 681 is discussed in detail in the application Ser. No. 09/592,672 entitled "Network Channel Receiver Architecture" by Dean S. Susnow and Richard D. Reohr, Jr. filed on even date with this application. FIG. 8 illustrates an example block diagram of Elastic Buffer 682 provided to transition data from a network link into the core clock domain of VXB 670 responsible for transferring that data to MCH 620 without data overflow or data underflow according to example embodiments of the present invention. As shown in FIG. 8, Elastic Buffer 682 comprises a Memory Element 810, a Write Control unit 820, a Write Pointer Generation unit 830, a Synchronization unit 840, a Read Pointer Generation unit 860, an Output Control unit 850, and an Output Selection unit 870. The Memory Element 810, the Write Control unit 820 and the Write Pointer Generation unit 830 operate in the RXCLK domain, and are primarily responsible for storing received data into the Memory Element 810 and prohibiting data overflow, which can corrupt the data. Similarly, the Synchronization unit 840, the Read Pointer Generation unit 860, the Output Control unit 850, and the Output Selection unit 870 operate in the core clock domain of VXB 670, and are primarily responsible for retrieving the data stored in the Memory Element 810 and prohibiting data underflow, which can corrupt the data being transferred to MCH 320.

The Memory Element 810 may be a temporary storage device, such as a FIFO (First-In First-Out) data structure. The data may be stored sequentially into the Memory Element 810 in the order it was received so that it can be correspondingly transferred in sequential order. A typical FIFO may, however, present two distinct problems which relates to data overflow and data underflow. Data overflow may occur when the RXCLK is faster than the core clock and the FIFO essentially fills up. Since there is no more room in the FIFO for the data (because the core clock is too slow) data may be lost. Data underflow may occur when the core clock is faster than the RXCLK and the corresponding Memory Element 810 is starved for data. Data overflow and data underflow may be advantageously avoided or eliminated, however, by way of the Write Control unit 820, the Write Pointer Generation unit 830, the Synchronization unit 840, the Output Control unit 850, the Read Pointer Generation unit 860 and the Output Selection unit 870 according to the present invention. The optimum depth of Memory Element 810 may be calculated by the difference in frequency of the RXCLK versus the core clock and the inherent characteristics of the network link.

Start and End of Cell delimiter characters and inter-cell flow control sequences (Comma character and associated Flow Control character) may be taken into account to determine the maximum defined period between IDLE characters and the maximum number of non-IDLE characters or clock cycles which can occur between successive IDLE characters. This number along with the absolute difference in frequencies between the two clock domains may be used to determine the amount of additional locations needed in the Memory Element 810. In addition, Memory Element 810 employs two additional locations for write pointer synchronization into the core clock domain. Memory Element 810 may be implemented using a traditional FIFO register or simply successive banks of D-type flip-flops to provide the necessary elasticity required to properly synchronize the data to the core clock.

The Write Control unit 820 may be provided to examine all data received from the link and determine which characters require further processing. In particular, the Write Control unit 820 functions to identify specific IDLE sequences, including both IDLE-1 and IDLE-2 characters. IDLE characters can be transmitted on the link during inter-cell gap periods (IDLE periods which must occur between transmitted cells). In either case, VXB 670 gains no functionality by having these IDLE characters present in the received data stream. Therefore, these IDLE characters may be prohibited from entering the Memory Element 810 so as to allow the RXCLK to be faster than the core clock without causing the undesirable data overflow of the Memory Element 810. Accordingly, the Write Control unit 820 may be utilized to interrogate the received link data stream and prohibit IDLE-1 and IDLE-2 characters from being stored in the Memory Element 810 and processed by VXB 670. The WRITE signal output from the Write Control unit 820 determines if the link data, currently being received, is an IDLE character or not. The WRITE signal dictates if the received link data is to be stored in Memory Element 810 in the current RXCLK cycle. In short, the Write Control unit 820 ensures that no IDLE characters are written into the Memory Element 810.

The Write Pointer Generation unit 830 may be provided to maintain the current write address into the Memory Element 810 and determine the memory location in the Memory Element 810 where the currently received link data is to be stored. The Write Pointer Generation unit 830 may be an N-Bit Counter, where $2^N$ represents the total number of memory locations in Memory Element 810. For example, an 8 location deep memory element or FIFO may require a 3-bit counter which serves the function of Write Pointer Generation unit 830. This counter may effectively increment when the WRITE signal from the Write Control unit 820 is asserted, and alternatively, may be prohibited from incrementing when the WRITE signal is de-asserted. In a preferred embodiment, a Gray Counter may be utilized in lieu of a standard Binary Counter for enabling the current value of the Write Pointer to be synchronized into the core clock domain and determining the current state of memory fullness of the Memory Element 810. This is because only one bit of the Gray Counter may be allowed to change when transitioning from one count value to the next.

The Synchronization unit 840 may be provided to sample the current value of the Write Pointer from the RXCLK domain in accordance with the core clock in VXB 670 and present the Synchronized Write Pointer to the Output Control unit 850 for examination. In a preferred embodiment, a standard Double Synchronizer may be utilized to allow information from the RXCLK domain to be effectively examined in the core clock domain, which is asynchronous to the RXCLK domain.

The Output Control unit 850 may be provided to determine the current fullness of the Memory Element 810, that is, when the Memory Element 810 is empty. Emptiness may be defined when no data remains in the Memory Element 810 to be transferred out of VXB 670. This may occur either during link synchronization periods or during inter-cell gap periods since IDLE characters are not stored in the Memory Element 810 or if the core clock is faster than the RXCLK. The Output Control unit 850 examines the current state of the Read Pointer which is used to access the Receiver Data from the Memory Element 810 and compares the current Read Pointer with the current Write Pointer which is synchronized into the core clock domain. When the current Read Pointer corresponds to the Synchronized Write Pointer, the Output Control unit 850 may indicate that the Memory Element 810 is empty. The EMPTY signal from the Output Control unit 850 may be asserted to indicate this EMPTY condition.

In an example embodiment, a simple N-bit Equality Comparison circuit may be utilized to determine when the current Read Pointer corresponds to the Synchronized Write Pointer. Since the two sets of pointers (Read and Write) may be implemented as Gray counters such that only 1-bit changes per clock cycle, only one of the N Double Synchronizers may transition at a given time. This allows the Output Control unit 850 to accurately track memory fullness of the Memory Element 810. For example a binary transition from 7 (0x01111) to 8 (0x1000) requires the transition of all 4-bits in a single clock cycle. If the data is latched while this transition was occurring since the domains are asynchronous, an incorrect value may be latched due to set-up and hold violations at the Double Synchronizers causing metastability. The Output Control unit 850 may obtain an incorrect fullness of the Memory Element 810 producing undesirable results. The implementation of Gray code counters may prohibit this incorrect transition from happening. At worst the synchronized value may be off by 1-bit which implies the Memory Element 810 is empty for one (1) additional cycle. This has no effect on VXB 670 and maintains the integrity of the received link data.

The Read Pointer Generation unit 860 may be provided to effectively maintain the current read address into the Memory Element 810, and determine the memory location in the Memory Element 810 where the current data is to be retrieved. The Read Pointer Generation unit 860 is essentially a replication of the Write Pointer Generation unit 830 which operates in the core clock domain rather than the RXCLK domain. In other words, the Read Pointer Generation unit 860 may also be an N-Bit Gray Counter, where $2_N$ represents the total number of memory locations in the Memory Element 810. The Gray Counter may effectively increment when the EMPTY signal from the Output Control unit 850 is de-asserted, and alternatively, may be prohibited from incrementing when the EMPTY signal is asserted. Thus, data may be transferred out of Elastic Buffer 682 when the Memory Element 810 is not empty.

The Output Selection unit 870 may be provided to insert No-Operation (NOP) characters into the received link data stream when the Memory Element 810 is empty. The No-Operation (NOP) characters may be utilized to advantageously eliminate the undesirable data underflow of the Memory Element 810. This is because the NOP characters have no effect on the VXB 670 and therefore do not corrupt the stream of link data. In turn, VXB 670 may drop these NOP characters during link data processing.

Figure 9:
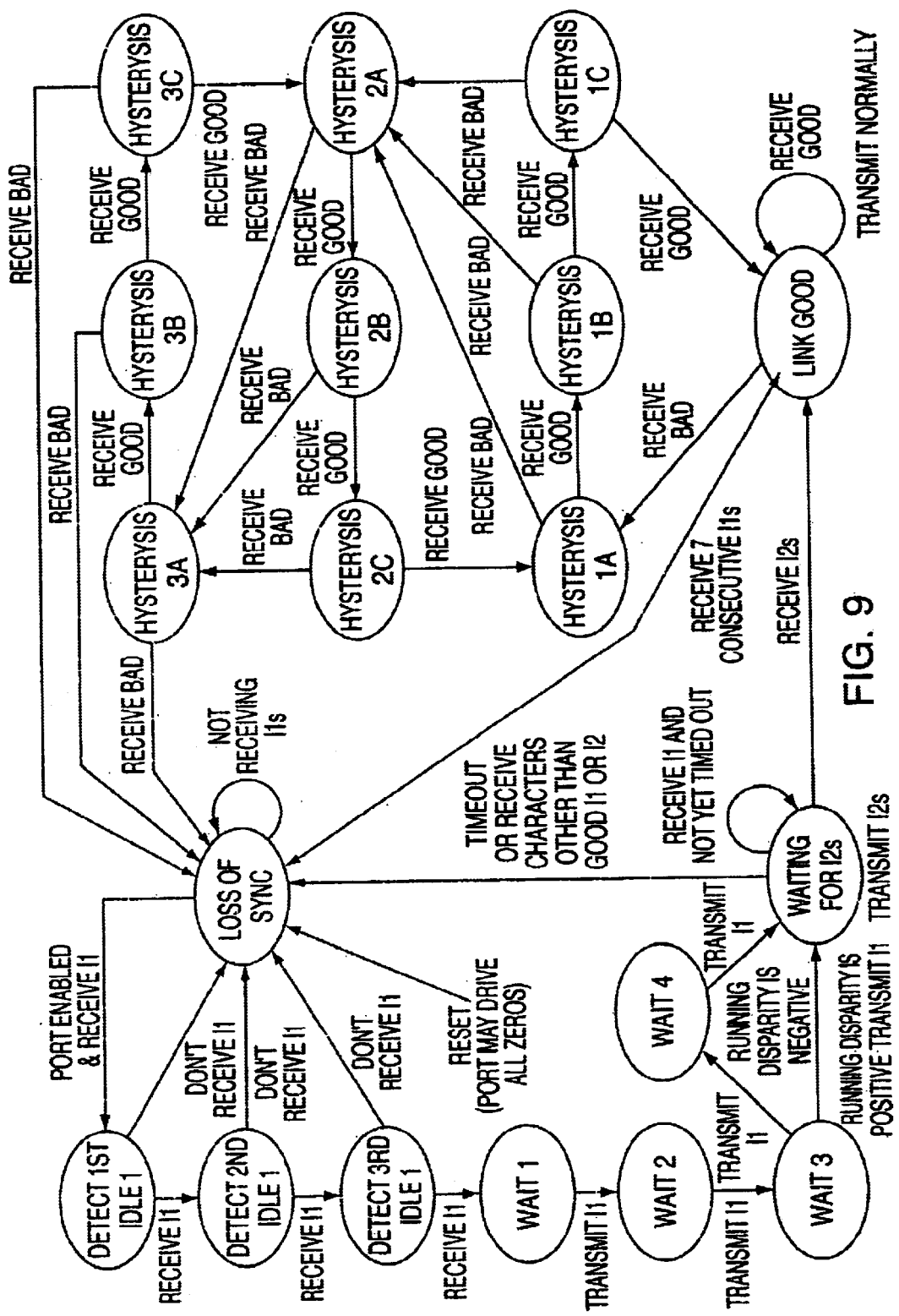
FIG. 9 is a link synchronization state machine according to an example embodiment of the invention.

The NGIO and Infiniband specifications require that every compatible device support an identical link synchronization technique. This allows the channel adapter on both ends of a communication link to expect a known relationship between what is transmitted and what is received. This relationship indicates whether the remote device is enabled to receive data, the running disparity of incoming traffic, and reliability of the communication link. FIG. 9 shows a slightly modified version of a link synchronization state machine for use with NGIO channel adapters. Although only a single oval is shown to represent the Detect $1^{st}$ Idle 1, Detect $2^{nd}$ Idle 1, Detect $3^{rd}$ Idle 1, Wait 1, Wait 2, Wait 3, Wait 4, and Waiting for I2s each require two link characters to be transmitted or received. The state machine may be implemented in hardware, firmware or software.

The state machine depicted in FIG. 9 implies a significant amount of interaction between the Transmitter 684 and Receiver 683 of a given port. In addition, as described above, the Elastic Buffer 682 prohibits IDLE sequences (IDLE-1, IDLE-2) from being processed at Receiver 683 in order to compensate for the associated clock differences of the two clock domains. The example embodiment of the invention thus logically partitions the functionality of the link synchronization state machine shown in FIG. 9 across the link clock domain and the core clock domain to minimize the level of interaction of the two associated domains, increase performance and minimize design complexity. The partition is represented by the shaded gray areas in FIG. 9.

The link synchronization process begins with the assertion of the Send-I1 signal to Transmitter 684. When this signal is sampled as being asserted, Transmitter 684 continuously transmits IDLE-1 character sequences until a change of state in the three associated control signals is detected. This accounts for the Detect $1^{st}$ IDLE-1, Detect $2^{nd}$ IDLE-1 and Detect $3^{rd}$ IDLE-1 states of the link synchronization state machine in FIG. 9.

The Send-I1 control signal remains asserted until 3 consecutive IDLE-1 sequences are received at the corresponding port. At this time, the Send-I1 control signal is de-asserted and the Send-I2 control signal is asserted indicating to Transmitter 684 to begin sending IDLE-2 character sequences. After the reception of the three consecutive IDLE-1 sequences, Transmitter 684 is required to send at least 3 more IDLE-1 sequences to allow the remote device to receive the necessary amount of IDLE-1 sequences. Since the latency across the two domains is unpredictable, this function is moved into Transmitter 684. Transmitter 684 detects the change of state of the Send-I1 and Send-I2 control signals and automatically sends three additional IDLE-1 sequences in compliance. This complies with the Wait 1, Wait 2 & Wait 3 logical states in the link state machine.

During inter-cell gap sequences, there is a return to negative disparity. This means that the physical connection should remain at negative disparity during the inter-cell gap. IDLE-1 sequences flip the corresponding disparity while IDLE-2 sequences maintain the current disparity. Therefore, disparity is determined at the transition of Transmitter 684 from sending IDLE-1 to IDLE-2sequences. This is the reason for the wait 4 state. This state examines the current running disparity of the transmit interface and forces the transmission of an additional IDLE-1 sequence to return the wire to negative disparity if necessary. It would be grossly inefficient to pass the current wire disparity into the link domain to make the determination of whether an additional IDLE-1 sequence is necessary to return the disparity to negative. Therefore, this function is also implemented in Transmitter 684. When Transmitter 684 detects the assertion of the Send-I2 control signal, it sends three additional IDLE-1 sequences and examines the current disparity of the wire by examining the "Running Disparity" output of the associated 8B/10B encoder in PHY 681 and makes the determination if the transmission of an additional IDLE-1 sequence is necessary prior to transmitting the initial IDLE-2 sequence.

Transmitter 684 continues sending IDLE-2 sequences until either the Send-I1 or Link Good signal becomes asserted. Send-I1 would become asserted if another character other than an IDLE-1 or IDLE-2 were received at Receiver 683. In that case, the synchronization process would start over. At the reception of the $1^{st}$ IDLE-2 at Receiver 683, the Link Good signal becomes asserted indicating the conclusion of link establishment. At this time, the control of Transmitter 684 is relinquished from the link synchronization state machine shown in FIG. 9 and granted to the transmit state machine (not shown).

Typically, hardware state machines transition state every clock cycle. However, the link interface provides a double pumped data stream. Essentially a single data character is received on each edge of the corresponding link clock. Thus, VXB 670 transmits or receives two characters every link clock. This works very well for the states in FIG. 9 that are shaded in gray because they expect to receive/transmit two characters per clock. The states on the unshaded right half of the state diagram assume a state change every character, which poses another significant design challenge, the implementation of the hysterysis part of the link synchronization within a double-pumped data stream.

In order to implement this functionality, the state machine within VXB 670 has more branches (not shown) since two characters are received each link clock. The hysterysis part of the state machine (the unshaded part) detects a sequence of good and bad characters. The implementation in VXB 670 has four branches during each one of these states to account for the two received characters each link clock. These branches are taken based on the four possible combinations of the first and second characters being good or bad.

The hysterysis state machine transitions a maximum total of two states per clock if necessary. The error outputs of the 8B/10B decoders provide the inputs that determine the transition through the hysterysis part of the state machine shown in FIG. 9. This occurs independently of any interaction of the Transmitter 684. Transmitter 684 is only informed when the hysterysis has determined that link synchronization is required. At that time, the Send-I1 control signal is asserted and re-synchronization proceeds.

Although an example embodiment, the invention is not limited to the network shown in FIG. 3, the processing system shown in FIG. 6, or the VXB shown in FIG. 6. Indeed, an advantage of the invention is that it may be particularly useful and widely adaptable to many network interfaces. In this way, communication links can be efficiently synchronized for a variety of devices connected to a channel-based, switched fabric architecture network by providing a data receiver as discussed in the example embodiment.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of synchronizing a communication link in a network interface having a transmitter in a core clock domain different from the link clock domain of the communication link, said method comprising:
   providing a link synchronization state machine to control the link synchronization process; and
   partitioning the functionality of the link synchronization state machine so that a plurality of functions of the link synchronization process are performed by the transmitter in the core clock domain.

2. The method recited in claim 1, wherein the method causes the transmitter to transmit a sequence of IDLE characters to establish link synchronization.

3. The method recited in claim 2, wherein the transmitter receives a plurality of control signals and automatically sends IDLE sequences when a certain change in the state of the control signals is detected.

4. The method recited in claim 3, wherein said plurality of control signals include Send-I1 and Send-I2 control signals.

5. The method recited in claim 4, wherein the receiver circuitry generates and outputs the Send-I1 and Send-I2 control signals to the transmitter.

6. The method recited in claim 4, wherein when the transmitter detects the assertion of the Send-I2 control signal, it sends 3 additional IDLE-1 sequences and makes the determination if the transmission of an additional IDLE-1 sequence is necessary prior to transmitting the initial IDLE-2 sequence.

7. A link synchronization program stored as a plurality of computer instructions in a tangible medium, said process, when executed, carrying out a method of synchronizing a communication link in a network interface having a transmitter in a core clock domain different from the link clock domain of the communication link, said method comprising:
   providing a link synchronization state machine to control the link synchronization process; and
   partitioning the functionality of the link synchronization state machine so that a plurality of functions of the link synchronization process are performed by the transmitter in the core clock domain.

8. The link synchronization program recited in claim 7, wherein the program causes the transmitter to transmit a sequence of IDLE characters to establish link synchronization.

9. The link synchronization program recited in claim 8, wherein the transmitter receives a plurality of control signals and automatically sends IDLE sequences when a certain change in the state of the control signals is detected.

10. The link synchronization program recited in claim 9, wherein said plurality of control signals include Send-I1 and Send-I2 control signals.

11. The link synchronization program recited in claims 10, wherein the receiver circuitry generates and outputs the Send-I1 and Send-I2 control signals to the transmitter.

12. The link synchronization program recited in claim 10, wherein when the transmitter detects assertion of the Send-I2 control signal, it sends 3 additional IDLE-1 sequences and makes the determination if the transmission of an additional IDLE-1 sequence is necessary prior to transmitting the initial IDLE-2 sequence.

13. A channel adapter for use in a device having a transmitter in a core clock domain different than the link clock domain of the communication link, comprising:
   a physical logic block coupled to receive data from said communication link and operation in said link clock domain;
   a receiver logic block configured to provide a plurality of control signals in the core clock domain relating to a link synchronization method; and
   a transmitter logic block transmitting signals to establish link synchronization according to a link synchronization state machine and control signals received from said receiver logic.

14. The channel adapter as claimed in claim 13, wherein said data is received via Infiniband or NGIO communication links.

15. The channel adapter as claimed in claim 13, wherein said plurality of control signals include Send-I1 and Send-I2 control signals.

16. The channel adapter as claimed in claim 15, wherein the link synchronization method consists of the transmission of IDLE-1 and IDLE-2 characters.

17. The channel adapter as claimed in claim 16, wherein when the transmitter detects assertion of the Send-I2 control signal, it sends 3 additional IDLE-1 sequences and makes the determination if the transmission of an additional IDLE-1 sequence is necessary prior to transmitting the initial IDLE-2 sequence.

18. The host channel adapter as claimed in claim 13, wherein the host channel adapter is implemented as part of a virtual interface expansion bridge, said virtual interface expansion bridge providing the data to a host procession system.

* * * * *